US008467721B2

(12) United States Patent
Henry, Jr. et al.

(10) Patent No.: US 8,467,721 B2
(45) Date of Patent: *Jun. 18, 2013

(54) SYSTEMS AND METHODS FOR DELIVERING A CONVERTED MESSAGE TO A VEHICLE MEDIA SYSTEM

(75) Inventors: Coulter C. Henry, Jr., Marietta, GA (US); Daryl Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/175,999

(22) Filed: Jul. 5, 2011

(65) Prior Publication Data

US 2011/0263197 A1  Oct. 27, 2011

Related U.S. Application Data

(63) Continuation of application No. 11/757,170, filed on Jun. 1, 2007, now Pat. No. 7,986,914.

(51) Int. Cl.
*H04H 40/00* (2008.01)

(52) U.S. Cl.
USPC ............... 455/3.06; 340/825.24; 340/824.25; 381/2; 381/85

(58) Field of Classification Search
USPC ........................................................ 455/3.06
See application file for complete search history.

(56) References Cited

U.S. PATENT DOCUMENTS

| | | | |
|---|---|---|---|
| 5,991,615 A | 11/1999 | Coppinger et al. | |
| 6,091,956 A | 7/2000 | Hollenberg | |
| 6,154,658 A | 11/2000 | Caci | |
| 6,360,252 B1* | 3/2002 | Rudy et al. | 709/206 |
| 6,381,535 B1 | 4/2002 | Durocher et al. | |
| 6,430,604 B1* | 8/2002 | Ogle et al. | 709/207 |
| 6,459,988 B1 | 10/2002 | Fan et al. | |
| 6,529,706 B1 | 3/2003 | Mitchell | |
| 6,532,418 B2 | 3/2003 | Chun et al. | |
| 6,654,790 B2* | 11/2003 | Ogle et al. | 709/206 |
| 6,662,163 B1 | 12/2003 | Albayrak et al. | |
| 6,678,612 B1 | 1/2004 | Khawam | |
| 6,728,531 B1 | 4/2004 | Lee et al. | |
| 6,735,435 B2* | 5/2004 | Newell et al. | 455/419 |
| 6,741,841 B1 | 5/2004 | Mitchell | |
| 6,757,544 B2 | 6/2004 | Rangarajan et al. | |
| 6,757,722 B2 | 6/2004 | Lonnfors et al. | |
| 6,763,226 B1 | 7/2004 | McZeal, Jr. | |
| 6,773,344 B1 | 8/2004 | Gabai et al. | |
| 6,807,254 B1 | 10/2004 | Guedalia et al. | |
| 6,826,407 B1 | 11/2004 | Helferich | |

(Continued)

*Primary Examiner* — Hai V Nguyen

(74) *Attorney, Agent, or Firm* — Parks IP Law LLC; Jennifer P. Medlin Esq.

(57) ABSTRACT

Architecture for playing back personal text-based messages such as email and voicemail over a vehicle-based media system. The user can use a cell phone that registers over a cellular network to an IMS (IP multimedia subsystem) to obtain an associated IP address. The personal messages are then converted into audio signals using a remote text-to-voice (TTV) converter and transmitted to the phone based on the IP address. The phone then transmits the audio signals to the vehicle media system for playback using an unlicensed wireless technology (e.g., Bluetooth, Wi-Fi, etc.). Other alternative embodiments include transmitting converted message directly to the media system, via a satellite channel, converting the messages via a TTV converter on the cell phone, and streaming the converted messages to the phone and/or the media system for playback.

16 Claims, 10 Drawing Sheets

U.S. PATENT DOCUMENTS

| | | |
|---|---|---|
| 6,850,497 B1 | 2/2005 | Sigler et al. |
| 6,873,905 B2 | 3/2005 | Endo et al. |
| 6,895,238 B2 * | 5/2005 | Newell et al. ............ 455/414.2 |
| 6,931,255 B2 | 8/2005 | Mekuria |
| 6,963,633 B1 * | 11/2005 | Diede et al. ............... 379/88.03 |
| 6,970,935 B1 * | 11/2005 | Maes ........................... 709/230 |
| 6,973,387 B2 | 12/2005 | Masclet et al. |
| 6,981,023 B1 | 12/2005 | Hamilton et al. |
| 6,981,263 B1 * | 12/2005 | Zhang et al. ................. 719/310 |
| 6,993,347 B2 | 1/2006 | Bodin et al. |
| 6,996,227 B2 | 2/2006 | Albal et al. |
| 6,999,469 B1 * | 2/2006 | Chu et al. ....................... 370/466 |
| 7,006,609 B2 * | 2/2006 | Cloutier et al. ............. 379/88.23 |
| 7,039,402 B1 | 5/2006 | Gan et al. |
| 7,043,232 B2 * | 5/2006 | Pelaez et al. ............... 455/412.1 |
| 7,049,982 B2 | 5/2006 | Sleboda et al. |
| 7,127,400 B2 * | 10/2006 | Koch .......................... 704/270.1 |
| 7,239,881 B2 | 7/2007 | Lekutai |
| 7,254,417 B2 * | 8/2007 | Slemmer et al. ............ 455/556.1 |
| 7,257,426 B1 * | 8/2007 | Witkowski et al. ........ 455/569.2 |
| 7,310,329 B2 * | 12/2007 | Vieri et al. .................... 370/352 |
| 7,346,374 B2 * | 3/2008 | Witkowski et al. ........ 455/569.2 |
| 7,415,240 B2 | 8/2008 | Slemmer et al. |
| 7,427,024 B1 | 9/2008 | Gazdzinski et al. |
| 7,440,556 B2 | 10/2008 | Bear et al. |
| 7,443,971 B2 | 10/2008 | Bear et al. |
| 7,454,203 B2 | 11/2008 | Levitan |
| 7,457,638 B2 | 11/2008 | Dhillon et al. |
| 7,463,890 B2 | 12/2008 | Herz et al. |
| 7,472,068 B2 * | 12/2008 | Koch .......................... 704/270.1 |
| 7,487,112 B2 | 2/2009 | Barnes, Jr. |
| 7,489,946 B2 * | 2/2009 | Srinivasan et al. ......... 455/556.1 |
| 7,496,102 B2 | 2/2009 | Chow et al. |
| 7,496,516 B2 * | 2/2009 | Tessel et al. .................. 704/275 |
| 7,499,704 B1 | 3/2009 | Bonner |
| 7,512,714 B2 | 3/2009 | Eckert |
| 7,545,918 B2 * | 6/2009 | Edwards ..................... 379/88.22 |
| 7,561,963 B2 | 7/2009 | Brice et al. |
| 7,574,821 B2 | 8/2009 | Furem |
| 7,577,429 B2 | 8/2009 | Bear et al. |
| 7,578,079 B2 | 8/2009 | Furem |
| 7,599,691 B1 | 10/2009 | Mitchell |
| 7,602,895 B2 | 10/2009 | Terry et al. |
| 7,603,433 B1 * | 10/2009 | Paterik ......................... 709/217 |
| 7,649,877 B2 * | 1/2010 | Vieri et al. .................... 370/352 |
| 7,676,405 B2 | 3/2010 | Steelberg et al. |
| 7,680,254 B2 * | 3/2010 | Archer et al. ............... 379/88.18 |
| 7,701,331 B2 * | 4/2010 | Tran ............................ 340/539.1 |
| 7,706,511 B2 * | 4/2010 | Vieri et al. .................. 379/88.01 |
| 7,720,489 B2 * | 5/2010 | Engelhart, Sr. ............. 455/456.5 |
| 7,734,023 B2 * | 6/2010 | Bettis et al. ................. 379/88.25 |
| 7,792,053 B1 | 9/2010 | Chow et al. |
| 7,792,906 B2 * | 9/2010 | Garcia-Martin et al. ..... 709/206 |
| 7,796,538 B1 | 9/2010 | Chow et al. |
| 7,796,592 B2 * | 9/2010 | Stafford et al. ............... 370/389 |
| 7,822,612 B1 * | 10/2010 | Goodheart .................... 704/275 |
| 7,844,286 B1 * | 11/2010 | Sennett et al. ................ 455/466 |
| 7,895,631 B1 * | 2/2011 | Stark ............................... 725/80 |
| 7,929,670 B2 * | 4/2011 | Saleh et al. .................. 379/88.01 |
| 7,933,390 B2 * | 4/2011 | Bedingfield et al. ....... 379/88.18 |
| 7,974,646 B2 * | 7/2011 | Engelhart, Sr. ............... 455/466 |
| 7,986,914 B1 * | 7/2011 | Henry et al. ................. 455/3.06 |
| 8,031,644 B2 * | 10/2011 | Ahmavaara .................. 370/310 |
| 8,064,909 B2 * | 11/2011 | Spinelli et al. ............... 455/436 |
| 8,085,741 B2 * | 12/2011 | Kiss et al. .................... 370/338 |
| 8,090,351 B2 * | 1/2012 | Klein ............................ 455/411 |
| 8,139,739 B2 * | 3/2012 | Wuthnow et al. ........ 379/201.01 |
| 8,156,005 B2 * | 4/2012 | Vieri ........................... 705/14.64 |
| 2002/0022453 A1 | 2/2002 | Balog et al. |
| 2002/0030605 A1 | 3/2002 | Roberts, Jr. |
| 2002/0087634 A1 * | 7/2002 | Ogle et al. .................... 709/204 |
| 2002/0128000 A1 | 9/2002 | do Nascimento, Jr. |
| 2002/0142764 A1 * | 10/2002 | Newell et al. ................ 455/419 |
| 2003/0036844 A1 | 2/2003 | Balasuriya |
| 2003/0050075 A1 | 3/2003 | Rangarajan et al. |
| 2003/0065805 A1 | 4/2003 | Barnes, Jr. |
| 2003/0076934 A1 | 4/2003 | Albal et al. |
| 2003/0147534 A1 | 8/2003 | Ablay et al. |
| 2003/0195814 A1 | 10/2003 | Striemer |
| 2003/0220835 A1 | 11/2003 | Barnes, Jr. |
| 2004/0029569 A1 * | 2/2004 | Khan et al. .................. 455/414.1 |
| 2004/0030750 A1 | 2/2004 | Moore et al. |
| 2004/0093299 A1 | 5/2004 | Bodin et al. |
| 2004/0121729 A1 | 6/2004 | Herndon et al. |
| 2004/0128129 A1 | 7/2004 | Sherman |
| 2004/0148091 A1 | 7/2004 | Masclet et al. |
| 2004/0185842 A1 | 9/2004 | Spaur et al. |
| 2004/0190689 A1 | 9/2004 | Benitez Pelaez et al. |
| 2004/0223599 A1 | 11/2004 | Bear et al. |
| 2004/0224710 A1 * | 11/2004 | Koskelainen et al. ......... 455/518 |
| 2004/0240650 A1 | 12/2004 | Bear et al. |
| 2004/0267531 A1 * | 12/2004 | Whynot et al. ............... 704/260 |
| 2005/0069101 A1 | 3/2005 | Bear et al. |
| 2005/0111644 A1 * | 5/2005 | Edwards ................... 379/142.01 |
| 2005/0113113 A1 | 5/2005 | Reed |
| 2005/0136949 A1 | 6/2005 | Barnes, Jr. |
| 2005/0146445 A1 | 7/2005 | Sleboda et al. |
| 2005/0170869 A1 * | 8/2005 | Slemmer et al. ............ 455/575.1 |
| 2005/0201533 A1 | 9/2005 | Emam et al. |
| 2005/0210101 A1 | 9/2005 | Janik |
| 2005/0213790 A1 | 9/2005 | Rhoads et al. |
| 2005/0233742 A1 | 10/2005 | Karaoguz et al. |
| 2005/0273330 A1 | 12/2005 | Johnson |
| 2005/0282564 A1 | 12/2005 | Yoo |
| 2005/0286475 A1 * | 12/2005 | Ahmavaara .................. 370/335 |
| 2006/0031364 A1 | 2/2006 | Hamilton et al. |
| 2006/0034266 A1 | 2/2006 | Harris et al. |
| 2006/0095331 A1 | 5/2006 | O'Malley et al. |
| 2006/0101116 A1 * | 5/2006 | Rittman et al. ................ 709/204 |
| 2006/0111948 A1 | 5/2006 | Kivatinetz |
| 2006/0123053 A1 | 6/2006 | Scannell, Jr. |
| 2006/0133582 A1 | 6/2006 | McCulloch |
| 2006/0150152 A1 * | 7/2006 | Soini et al. .................... 717/116 |
| 2006/0168259 A1 * | 7/2006 | Spilotro et al. ............... 709/229 |
| 2006/0184456 A1 | 8/2006 | de Janasz |
| 2006/0187900 A1 | 8/2006 | Akbar |
| 2006/0187915 A1 * | 8/2006 | Caspi et al. ................... 370/389 |
| 2006/0189393 A1 | 8/2006 | Edery |
| 2006/0195540 A1 | 8/2006 | Hamilton et al. |
| 2006/0223512 A1 * | 10/2006 | Runge et al. .................. 455/418 |
| 2006/0248447 A1 | 11/2006 | Makkonen .................... 715/513 |
| 2006/0251232 A1 * | 11/2006 | Wuthnow et al. ........ 379/201.01 |
| 2006/0258394 A1 | 11/2006 | Dhillon et al. |
| 2006/0280165 A1 * | 12/2006 | Blumenschein et al. ..... 370/352 |
| 2006/0281447 A1 | 12/2006 | Lewis et al. |
| 2006/0286980 A1 | 12/2006 | Hua |
| 2007/0032225 A1 * | 2/2007 | Konicek et al. ............... 455/417 |
| 2007/0043687 A1 | 2/2007 | Bodart et al. |
| 2007/0053346 A1 * | 3/2007 | Bettis et al. ................... 370/352 |
| 2007/0064743 A1 * | 3/2007 | Bettis et al. ................... 370/503 |
| 2007/0082689 A1 * | 4/2007 | Talty et al. .................... 455/518 |
| 2007/0112571 A1 | 5/2007 | Thirugnana |
| 2007/0116222 A1 * | 5/2007 | Thelen ......................... 379/162 |
| 2007/0118426 A1 | 5/2007 | Barnes, Jr. |
| 2007/0124144 A1 | 5/2007 | Johnson |
| 2007/0129108 A1 | 6/2007 | Swanburg et al. |
| 2007/0140195 A1 | 6/2007 | Kaftan |
| 2007/0173266 A1 | 7/2007 | Barnes, Jr. |
| 2007/0190944 A1 | 8/2007 | Doan et al. |
| 2007/0207782 A1 | 9/2007 | Tran |
| 2007/0223523 A1 * | 9/2007 | Montpetit et al. ............ 370/465 |
| 2007/0239820 A1 * | 10/2007 | Zhong et al. .................. 709/201 |
| 2007/0270164 A1 | 11/2007 | Maier et al. |
| 2007/0293272 A1 | 12/2007 | Salmon |
| 2007/0294425 A1 * | 12/2007 | Sobti et al. .................... 709/231 |
| 2007/0299913 A1 * | 12/2007 | Griffin ........................... 709/205 |
| 2008/0010355 A1 * | 1/2008 | Vieri et al. .................... 709/206 |
| 2008/0013712 A1 | 1/2008 | Gopinath |
| 2008/0037741 A1 | 2/2008 | Bear et al. |
| 2008/0051120 A1 * | 2/2008 | Vieri et al. .................... 455/466 |
| 2008/0057925 A1 * | 3/2008 | Ansari ......................... 455/414.4 |
| 2008/0086564 A1 * | 4/2008 | Putman et al. ................ 709/227 |
| 2008/0090586 A1 * | 4/2008 | Engelhart ................... 455/456.1 |
| 2008/0101552 A1 * | 5/2008 | Khan et al. ..................... 379/45 |
| 2008/0109446 A1 | 5/2008 | Wang |
| 2008/0117839 A1 * | 5/2008 | Raju et al. ..................... 370/261 |
| 2008/0132279 A1 | 6/2008 | Blumenthal |

| | | | |
|---|---|---|---|
| 2008/0140408 A1* | 6/2008 | Basir | 704/260 |
| 2008/0155616 A1* | 6/2008 | Logan et al. | 725/93 |
| 2008/0158018 A1 | 7/2008 | Lau | |
| 2008/0160963 A1 | 7/2008 | Chi et al. | |
| 2008/0161047 A1 | 7/2008 | Witkowski et al. | |
| 2008/0162637 A1 | 7/2008 | Adamczyk et al. | |
| 2008/0163372 A1* | 7/2008 | Wang | 726/24 |
| 2008/0165767 A1 | 7/2008 | Kubler et al. | |
| 2008/0172474 A1 | 7/2008 | Larsson | |
| 2008/0186927 A1 | 8/2008 | Alam et al. | |
| 2008/0200143 A1* | 8/2008 | Qiu et al. | 455/404.2 |
| 2008/0205655 A1 | 8/2008 | Wilkins et al. | |
| 2008/0249778 A1 | 10/2008 | Barton et al. | |
| 2008/0254795 A1 | 10/2008 | Ratcliffe et al. | |
| 2008/0259884 A1* | 10/2008 | Nguyen | 370/338 |
| 2008/0259885 A1 | 10/2008 | Faulkner et al. | |
| 2008/0272934 A1 | 11/2008 | Wang et al. | |
| 2009/0006199 A1* | 1/2009 | Wang | 705/14 |
| 2009/0006418 A1 | 1/2009 | O'Malley | |
| 2009/0037962 A1* | 2/2009 | Benco et al. | 725/88 |
| 2009/0082928 A1* | 3/2009 | Witkowski et al. | 701/49 |
| 2009/0119013 A1 | 5/2009 | O'Malley | |
| 2009/0144624 A1 | 6/2009 | Barnes, Jr. | |
| 2009/0156213 A1* | 6/2009 | Spinelli et al. | 455/436 |
| 2009/0161631 A1 | 6/2009 | Chow et al. | |
| 2009/0198357 A1 | 8/2009 | Logan et al. | |
| 2009/0318084 A1* | 12/2009 | McCarthy et al. | 455/41.2 |
| 2010/0011128 A1* | 1/2010 | Paycher et al. | 710/1 |
| 2010/0063935 A1* | 3/2010 | Thomas et al. | 705/325 |
| 2010/0075640 A1 | 3/2010 | Helferich | |
| 2010/0076767 A1* | 3/2010 | Vieri et al. | 704/260 |
| 2010/0093320 A1* | 4/2010 | Ha et al. | 455/414.1 |
| 2010/0137037 A1* | 6/2010 | Basir | 455/569.1 |
| 2010/0190485 A1* | 7/2010 | Engelhart, Sr. | 455/422.1 |
| 2011/0028121 A1* | 2/2011 | Sennett et al. | 455/404.1 |
| 2011/0227698 A1* | 9/2011 | Witkowski et al. | 340/5.71 |
| 2011/0263197 A1* | 10/2011 | Henry et al. | 455/3.06 |
| 2011/0314169 A1* | 12/2011 | Van Elburg et al. | 709/228 |
| 2012/0044908 A1* | 2/2012 | Spinelli et al. | 370/331 |

* cited by examiner

SYSTEMS AND METHODS FOR DELIVERING A CONVERTED MESSAGE TO A VEHICLE MEDIA SYSTEM

CROSS REFERENCE TO RELATED APPLICATIONS

This application is a continuation of U.S. application Ser. No. 11/757,170, filed Jun. 1, 2007, now U.S. Pat. No. 7,986,914 the entirety of which is herein incorporated by reference.

TECHNICAL FIELD

This invention relates to wireless communication systems, and more specifically, to the playback of text-based messages via an audio system.

BACKGROUND

The convergence of the IP-based services and cellular communications services has opened the door for providing services that heretofore were not available to the cellular user who seeks access to IP-based networks, as well as for IP users seeking access to services of the cellular networks. Wireless devices such as portable computers and smartphones can now access services on wired/wireless networks using IP technology. Such advances have served as a catalyst for a mobile society where workers can commute greater distances while maintaining connectivity to businesses or homes. For example, users can be seen talking on cell phones and operating computers as they travel from location to location. These activities, while troublesome, are yet to be regulated in any significant way.

In today's world of electronics, there can be many potential distractions to drivers while traveling. For example, drivers read email, response to test messaging and/or attempt to listen to voicemail while driving. Conventional applications that attempted to address this growing problem employed FM modulators with small attached microphones to play voicemail, for example. However, there needs to be more hands-free, and hence, safer, mechanisms available for listening to email and other information while in a vehicle, whether the vehicle is moving or not.

SUMMARY

The following presents a simplified summary in order to provide a basic understanding of some aspects of the disclosed architecture. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture allows a user to receive personal messages (e.g., text-based) such as email and voicemail over a vehicle media system (e.g., radio). In one example, the vehicle user can listen to email and/or voicemail, and browse through such messages while the messages are being played over a car audio system.

In one embodiment, the user employs a cell phone that registers over the cellular network to an IMS (IP multimedia subsystem) to obtain an associated IP address. The personal messages are then converted into audio signals using a remote text-to-voice (TTV) converter and transmitted to the phone. The phone then transmits the audio signals to the vehicle media system for playback using an unlicensed wireless technology (e.g., Bluetooth, Wi-Fi, etc.).

In another embodiment, the user cell phone registers over the cellular network to the IMS entity to obtain an associated IP address. The personal messages are then converted into audio signals using the remote TTV converter and transmitted to the vehicle media system for playback based on the IP address associated with the cell phone. The user can then interact using the cell phone to browse other messages for download and playback.

In yet another embodiment, the user cell phone registers over the cellular network to the IMS entity to obtain an associated IP address. The personal messages are then input into the remote TTV converter and streamed therefrom over a direct bearer channel to the vehicle media system for playback based on the IP address associated with the cell phone. The user can then interact using the cell phone to browse other messages for download and playback.

In still another embodiment, the user cell phone registers over the cellular network to obtain an associated IP address. The requested text-based messages are then converted remotely and sent to a satellite system for further communication over a dedicated satellite channel to the vehicle (cell phone) associated with the IP address.

In another embodiment, the email and voicemail can be converted to an audio file format (e.g., MP3), sent to the cell phone, and therefrom, via an unlicensed wireless technology (e.g., short range communications) to a radio receiver that is already MP3-ready, for example.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
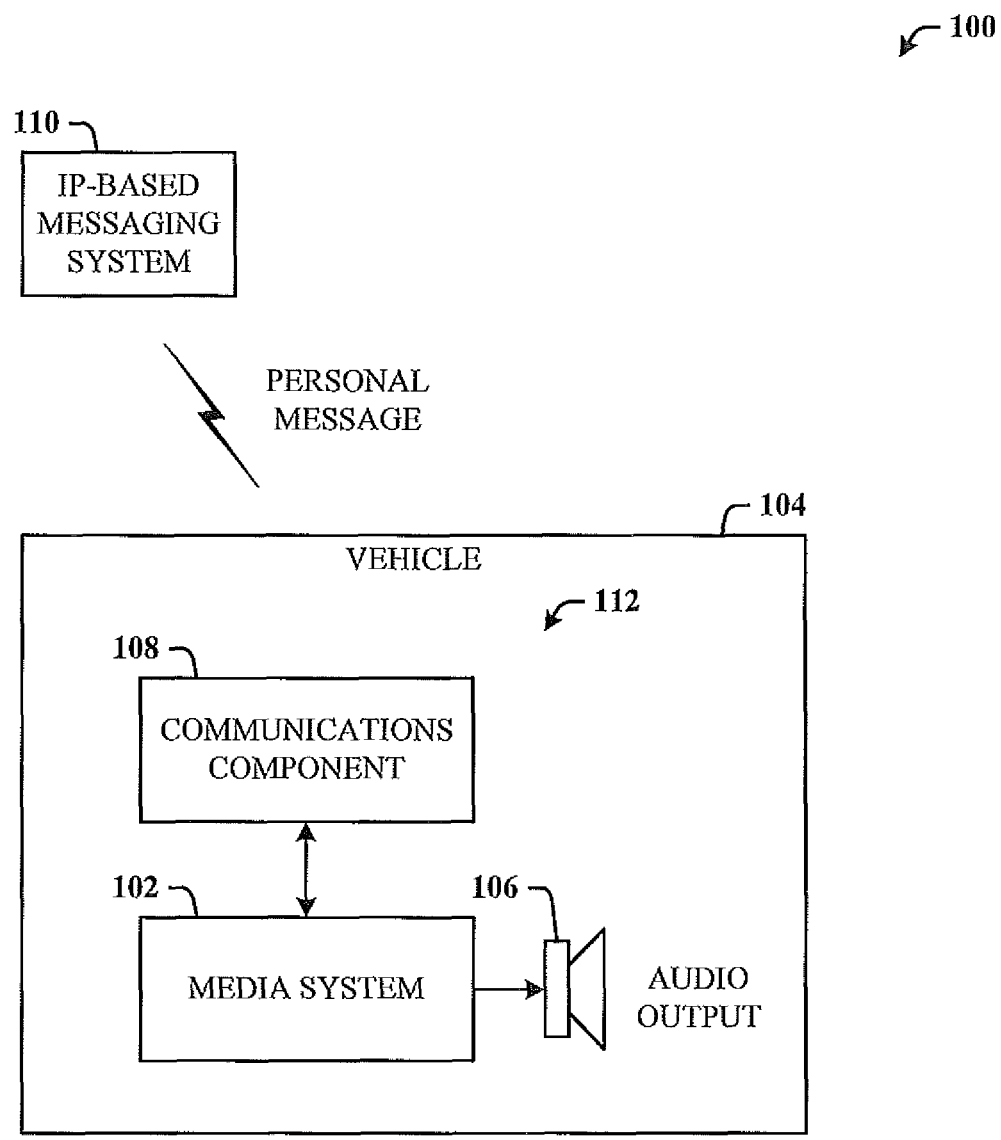
FIG. 1 illustrates a communications system for receiving and playing personal messages in a vehicle in accordance with the disclosed architecture.

As required, detailed novel embodiments are disclosed herein. It must be understood that the disclosed embodiments are merely exemplary and may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the invention. Therefore, specific structural and functional details disclosed herein are not to be interpreted as limiting, but merely as a basis for the claims and as a representative basis for teaching one skilled in the art to variously employ the invention.

Suitable wireless and radio frequency (RF) data transmission systems in which the disclosed invention can be implemented include, but are not limited to, networks utilizing time division multiple access (TDMA), frequency division multiple access (FDMA), wideband code division multiple access (WCDMA), orthogonal frequency division multiplexing (OFDM), wireless fidelity (Wi-Fi), and various other 2.5 and 3G (third generation) and above wireless communications systems. Examples of other suitable enabling bearers include universal mobile telecommunications system (UMTS), enhanced data rates for global evolution (EDGE), high speed downlink/uplink packet access (HSDPA/HSUPA), voice over Internet protocol (VoIP), and similar communications protocols.

Reference is now made to the drawings, wherein like reference numerals are used to refer to like elements throughout.

Referring initially to the drawings, FIG. 1 illustrates a communications system 100 for receiving and playing personal messages in a vehicle in accordance with the disclosed architecture. The system 100 includes a media system 102 of a vehicle 104 for presenting audio information via an audio output element 106 (e.g., a speaker), and a communications component 108 (e.g., wireless radio receiver or transceiver subsystem) for receiving IP-based personal messages (e.g., voicemail, email, etc.) from an IP-based messaging system 110 for presentation via the media system 102. Although depicted as separate from the media system 102, the communications component 108 can be designed as an integral part of the vehicle media system 102. For example, the communications component 108 can be an IP-addressable (or capable) receiving device or subsystem designed as part of the media system 102 to receive addressable data packets that are only transmitted to and received by a single user personal system (e.g., the vehicle media system 112).

In operation, a user can receive personal messages to be played by the vehicle media system 102. For example, an email message can be initially delivered to the messaging system 110 as a text message, converted to into an audio format (e.g., MP3), transmitted to the communications component 108 of the vehicle 104, and then played by the media system 102. Alternatively, or in combination therewith, the messaging system 110 can include a text-to-voice (TTV) converter subsystem (not shown) for converting text messages (e.g., email, SMS, etc.) into voice for playback on the media system 102.

In one implementation, the messaging system 110 begins streaming the voice file to the communications component 108 as the voice file is being converted from text by the TTV converter. Alternatively, the messaging system 110 receives a trigger signal (e.g., from a cellular system) that causes the TTV subsystem to begin converting the stored messages from the user account and then sending the converted audio (or voice) files to the communications component 108 ultimately for playback by the vehicle media system 112.

Note that as used herein, the term "vehicle" includes any transportation mechanism such as an automobile, truck, vessel, water craft, aircraft, and motorized or un-motorized transport system, for example.

In another implementation, the user account can include stored voicemail messages which may already be in a suitable audio format (e.g., MP3, WAV, etc.) for transmission to the communications component 108. If not, the voicemail messages can be routed through the TTV converter for conversion into a suitable audio format for playback by the vehicle media system 112.

As illustrated, the messaging system 110 communicates the person message directly to the vehicle communications component 108. In other words, the personal messages can be transmitted via RF signals using a satellite system (not shown). Alternatively, or in combination therewith, the messaging system 110 can be an IP-based cellular communications system for communicating a converted message to the communications component 108. For example, the communications component 108 can register with an IP multimedia subsystem (IMS) entity of a cellular network to receive the personal messages as IP-based packets. Given the nature of data packets and associated communications medium, it is also possible to encrypt the personal messages as a means of providing security against unauthorized access of the personal messages during the communications process.

It is also within contemplation of the subject architecture that the vehicle media system 112 can receive and output multimedia content via a display such that the vehicle user can view the personal message separately or in combination with hearing the audio playback.

Figure 2:
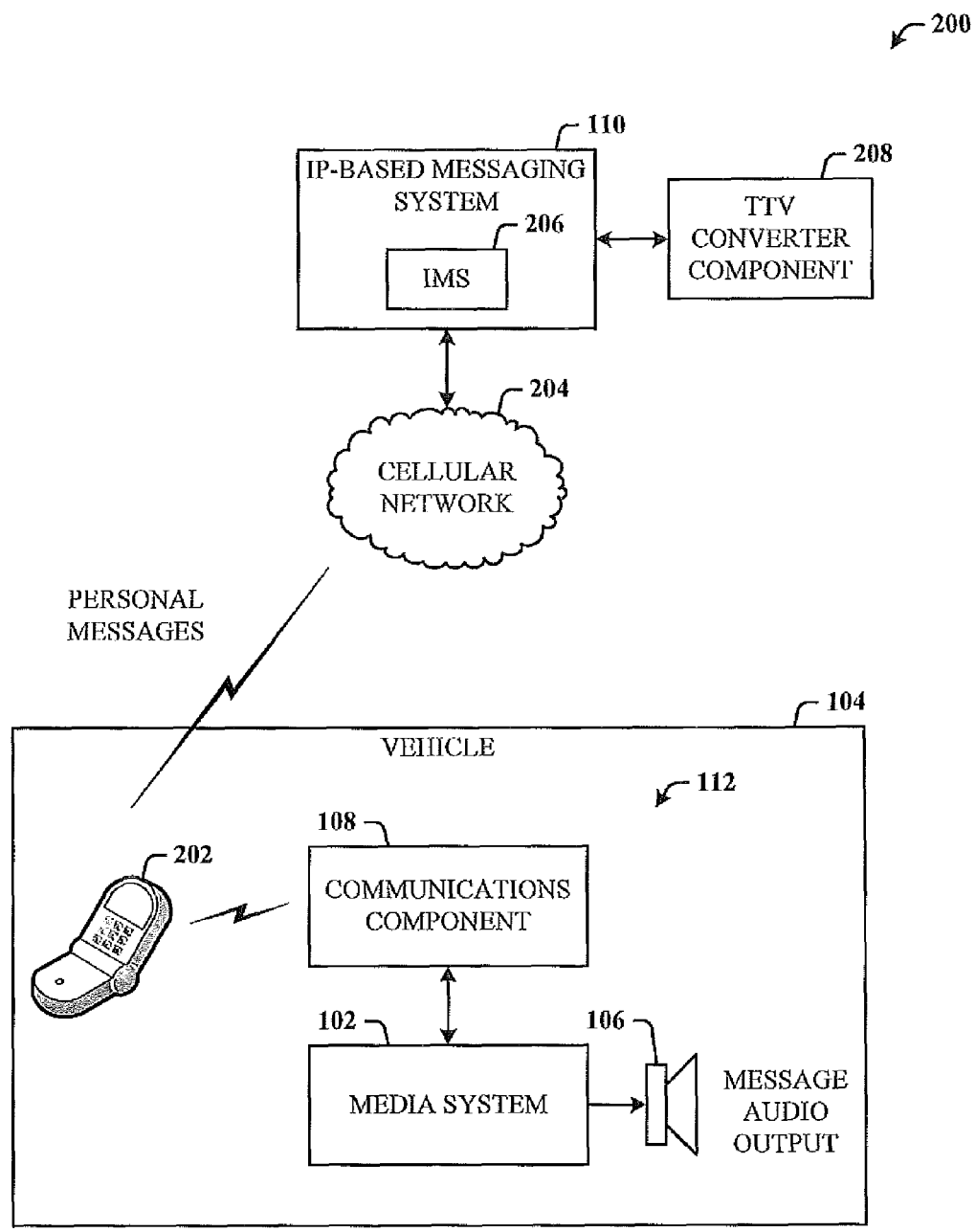
FIG. 2 illustrates an alternative system where the personal messages are received via a cell phone and thereafter communicated to the vehicle media system for presentation.

FIG. 2 illustrates an alternative system 200 where the personal messages are received via a cell phone 202 and thereafter communicated to the vehicle media system 112 for presentation. Here, the IP-based messaging system 110 (e.g., IMS-based) is associated with a cellular network 204 (e.g., UMTS). The cell phone 202 registers with an IMS entity 206 of the messaging system 110 to receive the personal messages. The messages can be converted from TTV using a remote TTV converter 208 associated with the messaging system 110. A converted message is received into the phone 202 from the network 204, and thereafter, communicated to the communications component 108 when the phone 202 is in sufficient radio range of the communications component 108 of the vehicle 104. The communications component 108 receives the messages wirelessly from the cell phone 202. The cell phone 202 communicates the messages to the media system 102 (through the communications component 108) via unlicensed wireless radio frequency (RF) signals (e.g., Bluetooth™, Wi-Fi, etc.). The messages can be encrypted from the cell phone 202 to the communications component 108, and then decrypted by the communications component 108 for playback by the media system 102 as audio output.

The phone user does not need to receive the audio output while the vehicle 104 is moving. Moreover, the phone 202 does not need to be inside the vehicle 104. All that is required is that the phone 202 be within the radio range of the communications component 108 based on the particular wireless technology (e.g., Bluetooth) employed for communications between the phone 202 and the communications component 108. Thus, the user can listen to the message(s) while parked and standing outside the vehicle 104. Additionally, the connection between the phone 202 and the communications component 108 can be via a cable or wire rather than wireless, or used in combination with the wireless connection.

Figure 3:
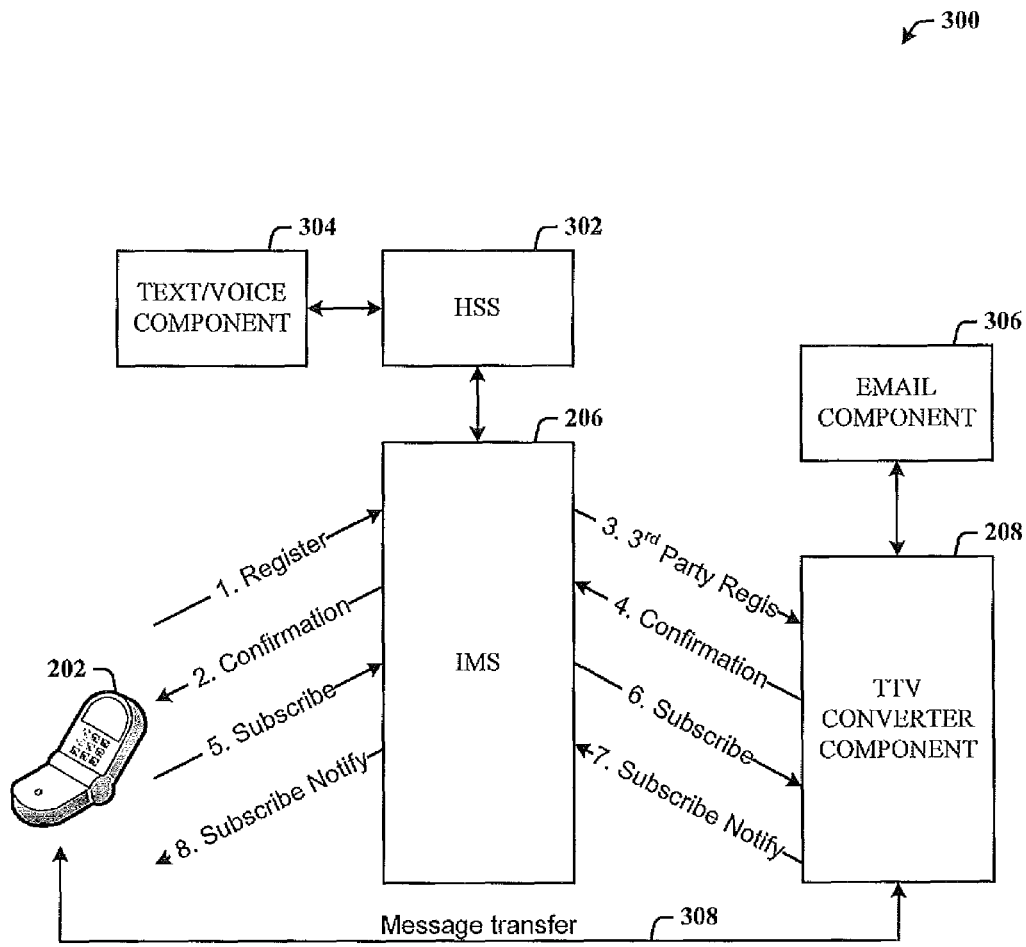
FIG. 3 illustrates an exemplary system that employs the architecture with the IMS system.

FIG. 3 illustrates an exemplary system 300 that employs the architecture with the IMS system 206. The phone 202 registers with the IMS entity 206 via a cellular network (not shown). A confirmation is then sent from the IMS entity 206 back to the phone 202. The IMS entity 206 then registers to the TTV converter 208 via a 3$^{rd}$ party registration process. The converter 208 responds to the IMS 206 with a confirmation message. The phone 202 then subscribes to the IMS entity 206, which entity 206 then subscribes to the converter 208. The converter 208 responds to the IMS entity 206 with a subscribe notify message. The IMS 206 then sends a subscribe notify message to the phone 202.

The system 300 includes a home subscriber server (HSS) 302 that can be employed to store and serve user (or subscriber) profiles (e.g., preferences, accounts, etc.), perform authentication and authorization functions, and physical location information about the user. The HSS 302 provides the interface between the IMS entity 206 and a text and voice component 304. The HSS 302 stores the text and/or voice data received from the component 304, and serves the data into the IMS entity 206 for conversion, where desired. In support thereof, if text data is served up from the HSS 302 for communication to the phone 202, the text data is passed to the TTV converter 208 for conversion, and then back to the IMS 206 for IP communication to the phone 202. As previously indicated, this can be communicated to the phone 202 wirelessly via the cellular network and/or a satellite system. Similar, a voice file from the component 304 that is stored on the IBS 302 can be accessed by the IMS 206 or pushed to the IMS 206 from the HSS 302 for conversion (if needed) and communications to the phone 202.

The system 300 can also include an email component 306 (e.g., an email server) that processes email, but which can also route email to the TTV converter 208 for conversion and transmission indirectly through the IMS 206 to the phone 202, and/or directly (via transfer pathway 308) from the TTV component 208 to the phone 202 (bypassing the IMS 206). In other words, text can be sent to the converter 208 for conversion and communication to the phone 202 as streaming audio over a direct bearer channel (e.g., the pathway 308).

Figure 4:
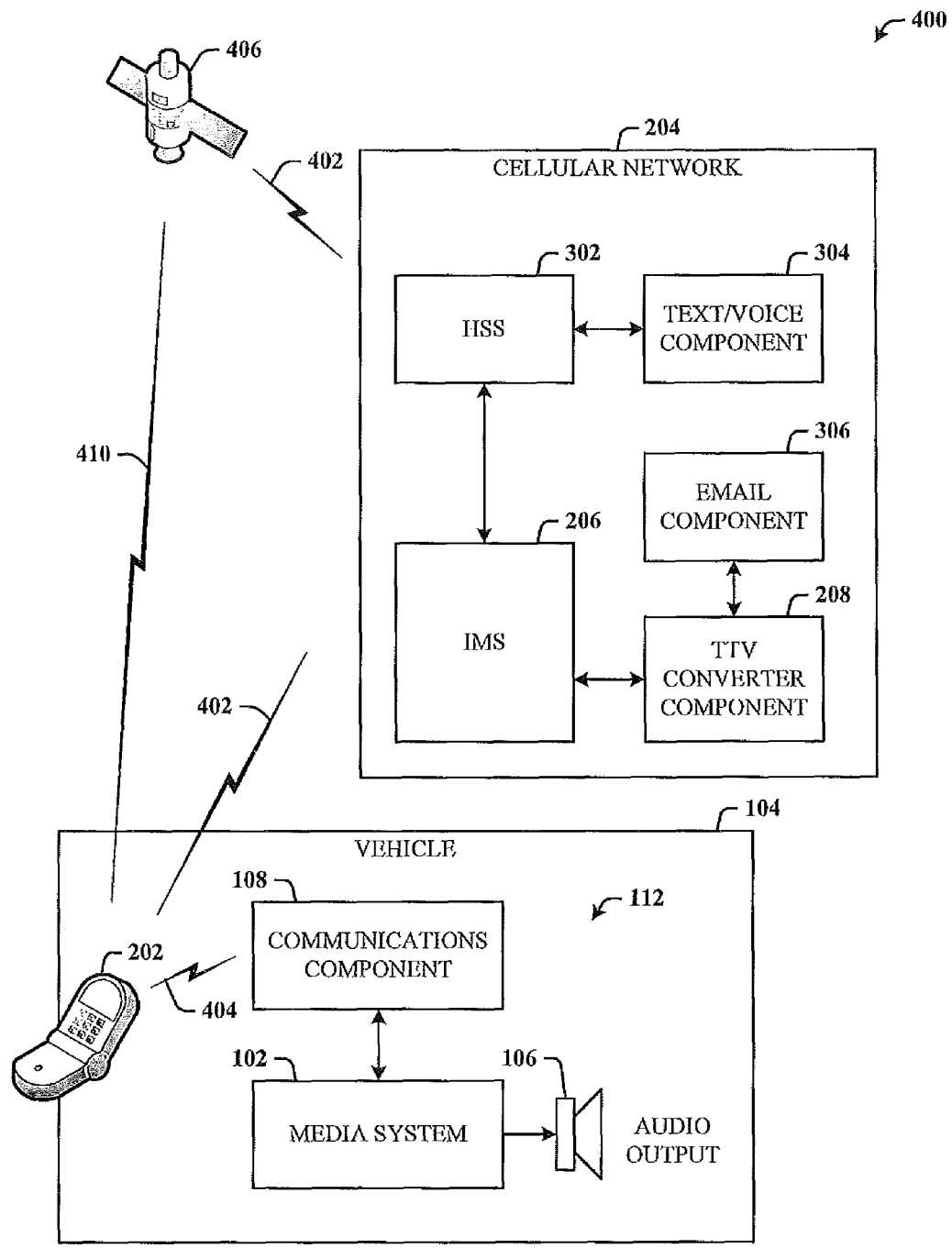
FIG. 4 illustrates an exemplary system that employs satellite communications to route the personal messages to the vehicle for presentation.

FIG. 4 illustrates an exemplary system 400 that employs satellite communications to route the personal messages to the vehicle for presentation. Here, the phone 202 initiates and completes IMS registration to the IMS entity 206 of the cellular network 204, over a first wireless link 402. As before, the IMS 206 completes the registration process through to the converter 208. The phone 202 can now receive converted text as audio (as well as unconverted data that does not require reformatting) over the first link 402 for wireless transmission of a second link 404 to the communications component 108 for processing and playback by the media system 102. Alternatively, the IMS registration process also assigns a dedicated satellite radio channel based on the IP address (or other unique identifier) assigned to the phone 202. The converted text (or messages) can then be communicated to a satellite 406 via a third link 408, and then communicated to the phone 202 of the vehicle 104 via a fourth link 410. The phone then communicates the voice data to the vehicle media system 112 for output as audio. Here, the satellite radio channel can be tied to the IP address of the user. Based on this relationship, the user's family could attach to the IP address and satellite channel to gain the benefit of the conversion capabilities. Moreover, this further allows each user to essentially have a dedicated satellite channel.

Figure 5:
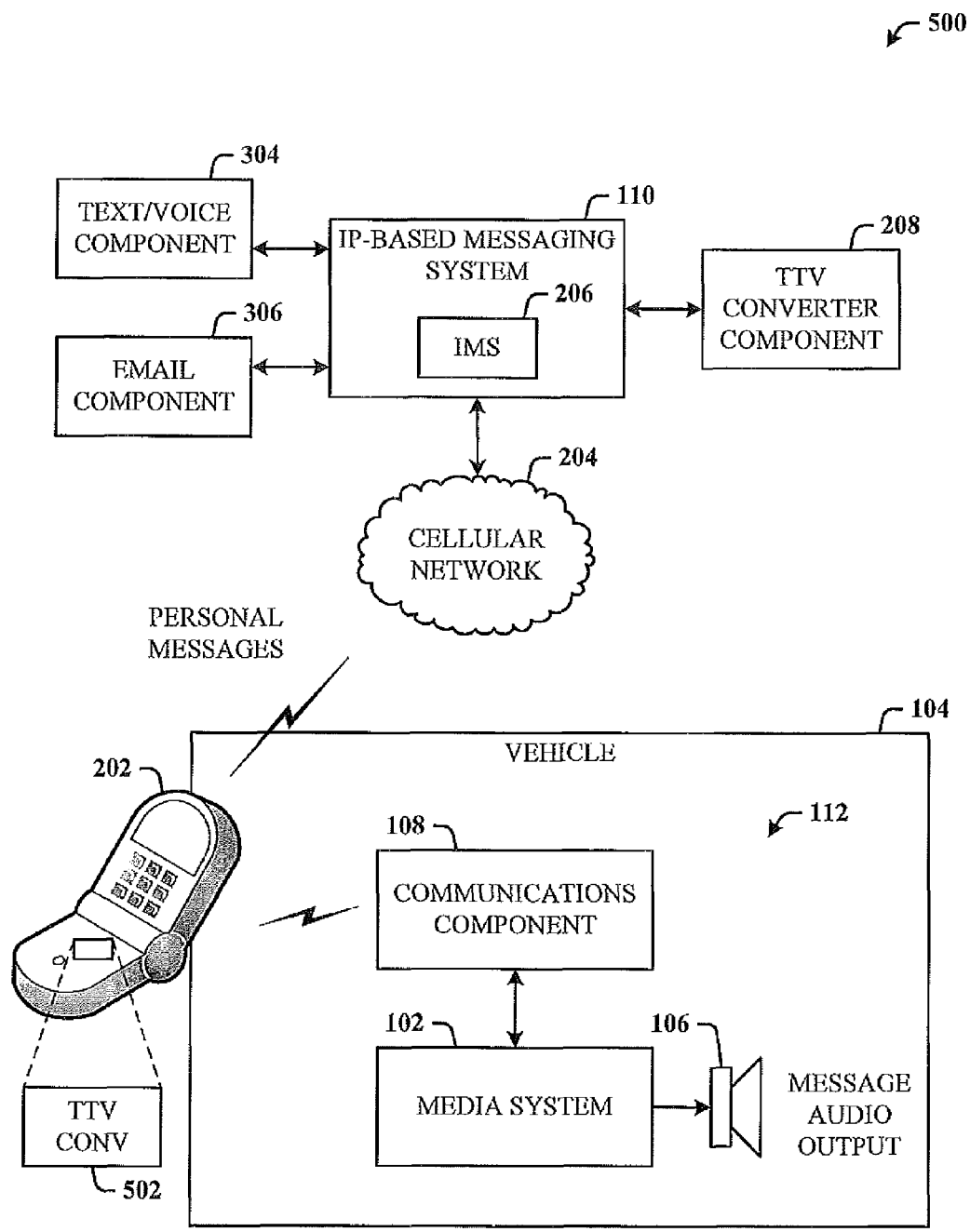
FIG. 5 illustrates an exemplary system that facilitates localized conversion of the messages in the phone.

FIG. 5 illustrates an exemplary system 500 that facilitates localized conversion of the messages in the phone 202. Here, the phone 202 includes a TTV converter subsystem 502 for converting text, email, or other similar types of messages into audio (e.g., voice). The system 500 provides the remote TTV converter 208 for those handsets that do not have the local converter 502 capability.

In operation, text, voicemail, email, or other types of personal messages can be received from the text/voice component 304 and/or the email component 306 into the messaging system 110. Based on IMS registration, the raw text, voice, email, or other messages can be routed to the registered phone 202, and processed internally into audio data for output by the vehicle media system 112. Use of the remote converter 208 or the local converter 502 can be selectable based on the system 500 capabilities. For example, it is to be appreciated that local conversion can be a processor-intensive operation such that it may be preferred to convert the messages remotely first, and then simply forward the converted files from the phone 202 to the vehicle media system 112 for playback.

It should be understood that the subject architecture is not limited to cell phones, but also applies to portable devices that have mobile capabilities, such as portable computers, for example. In other words, the vehicle user can register a portable computer to the IMS entity 206 and TTV converter 208, and have email converted, downloaded, and wirelessly transmitted from the portable computer to the communications component 108 for playback by the vehicle media system 112.

Figure 6:
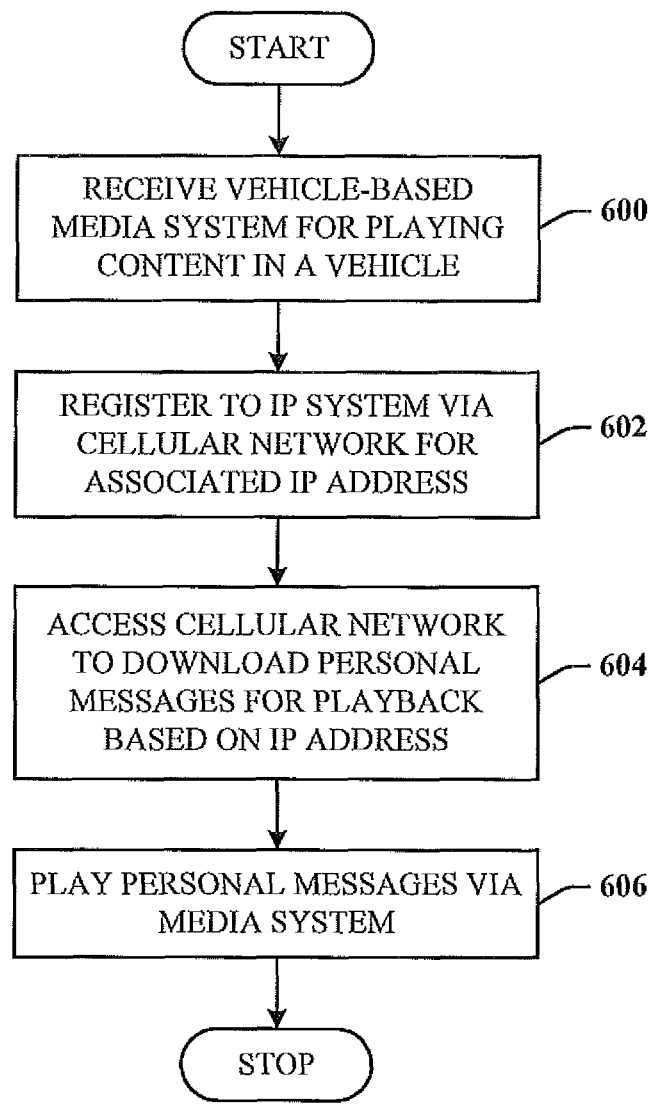
FIG. 6 illustrates a methodology of presenting messages in a communications system.

FIG. 6 illustrates a methodology of presenting messages in a communications system. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 600, a vehicle-based media system is received for playing content in a vehicle via an audio subsystem. At 602, registration is to an IP system via a cellular network for an associated IP address. At 604, the cellular network is accessed to download personal messages for playback based on the IP address. At 606, the audio signals associated with the personal messages are played via the media system.

Figure 7:
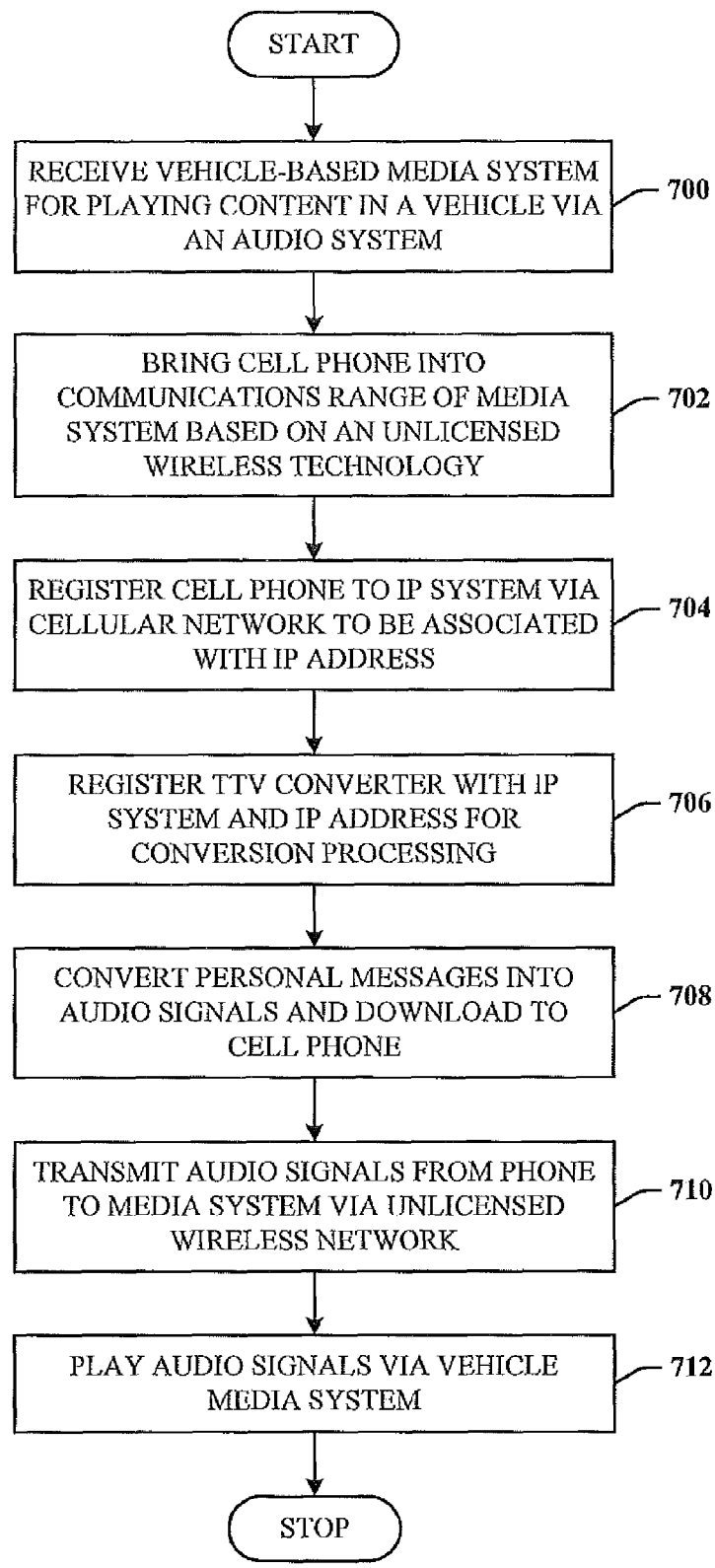
FIG. 7 illustrates a methodology of converting the personal messages remotely before download and playback.

FIG. 7 illustrates a methodology of converting the personal messages remotely before download and playback. At 700, a vehicle-based media system is received for playing content in a vehicle via an audio subsystem. At 702, a cell phone is brought into communications range of the media system in accordance with an unlicensed wireless technology. At 704, the cell phone registers to an IP system (e.g., IMS) via the cellular network to be associated with an IP address. At 706, a remote TTV converter is registered with the IP system and IP address for conversion processing. At 708, the personal messages are converted into audio signals. At 710, the audio signals are transmitted from the phone to the media system via the unlicensed wireless network. At 712, the audio signals are played back via the vehicle media system.

Figure 8:
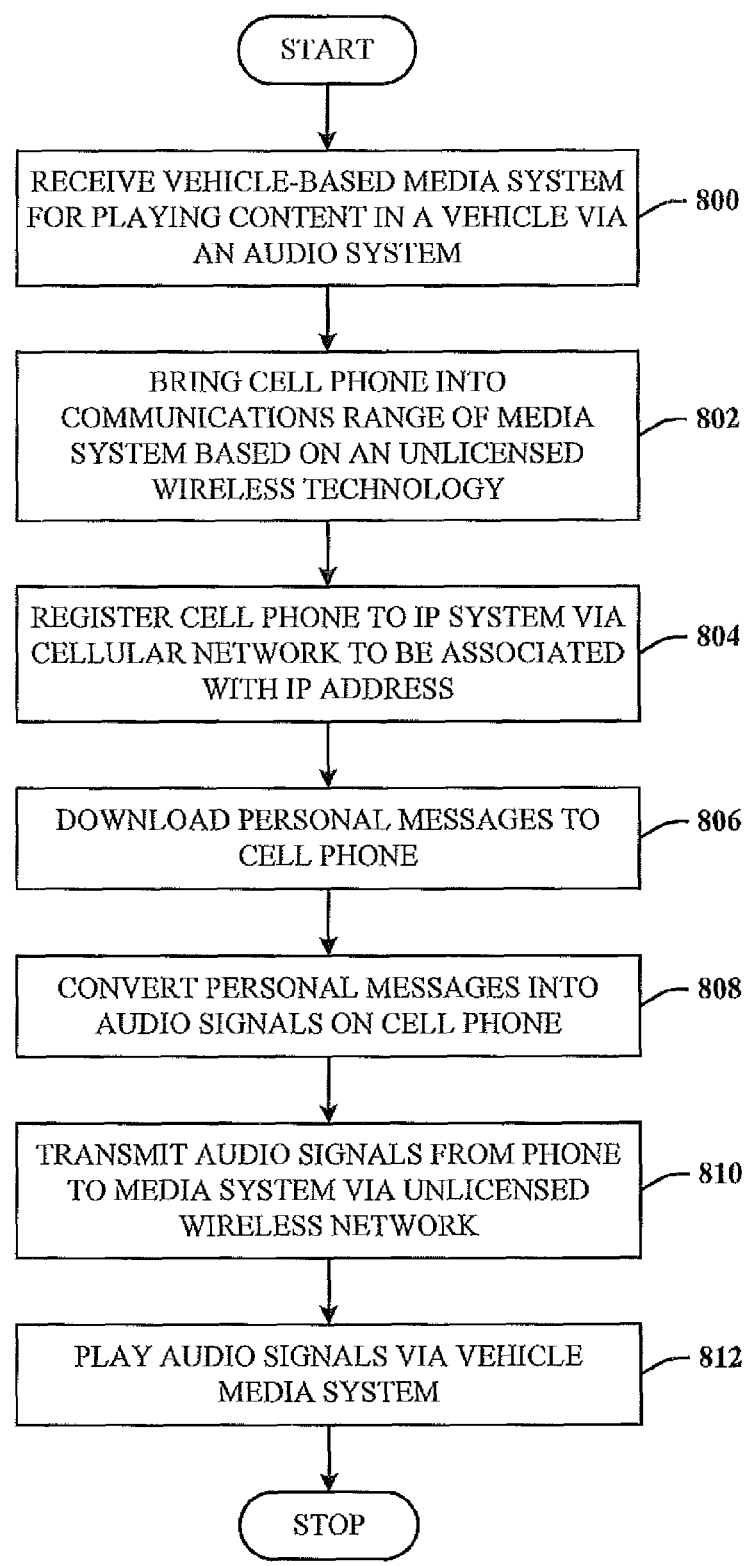
FIG. 8 illustrates a methodology of converting the personal messages locally after download.

FIG. 8 illustrates a methodology of converting the personal messages locally after download. At 800, a vehicle-based media system is received for playing content in a vehicle via an audio subsystem. At 802, a cell phone is brought into communications range of the media system in accordance with an unlicensed wireless technology. At 804, the cell phone registers to an IP system (e.g., IMS) via the cellular network to be associated with an IP address. At 806, the personal messages are downloaded to the cell phone. At 808, the personal messages are converted into audio signals using a phone-based TTV converter. At 810, the audio signals are transmitted from the phone to the media system via the unlicensed wireless network. At 812, the audio signals are played back via the vehicle media system.

Figure 9:
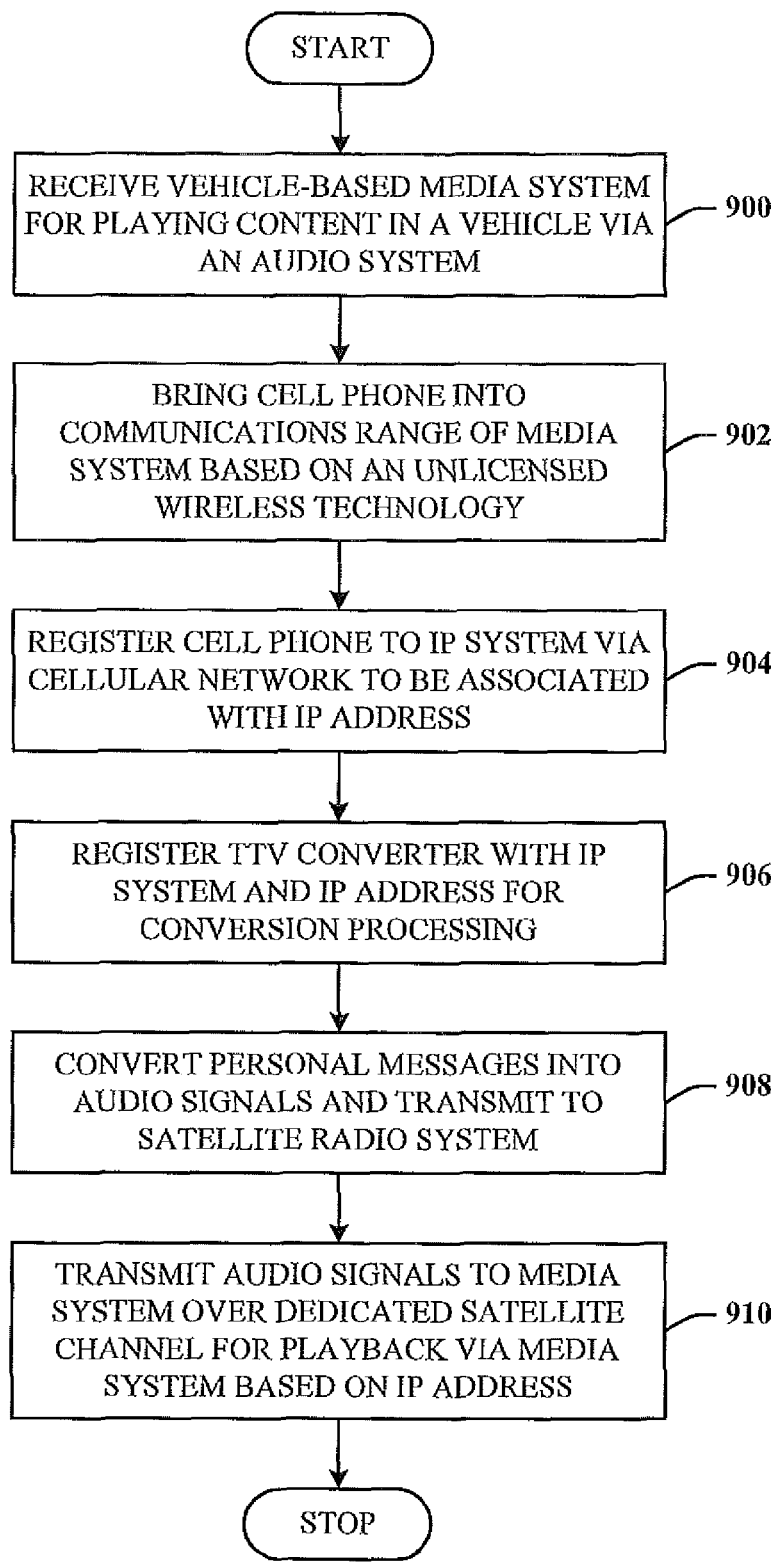
FIG. 9 illustrates a methodology of employing a satellite system for playback via a vehicle-based audio system.

FIG. 9 illustrated a methodology of employing a satellite system for playback via a vehicle-based audio system. At 900, a vehicle-based media system is received for playing content in a vehicle via an audio subsystem. At 902, a cell phone is brought into communications range of the media system in accordance with an unlicensed wireless technology. At 904, the cell phone registers to an IP system (e.g., IMS) via the cellular network to be associated with an IP address. At 906, a remote TTV converter is registered with the IP system and IP address for conversion processing. At 908, the personal messages are converted into audio signals and transmitted to a satellite system. At 910, the audio signals are transmitted to the media system for playback over a dedicated satellite channel based on the IP address.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Figure 10:
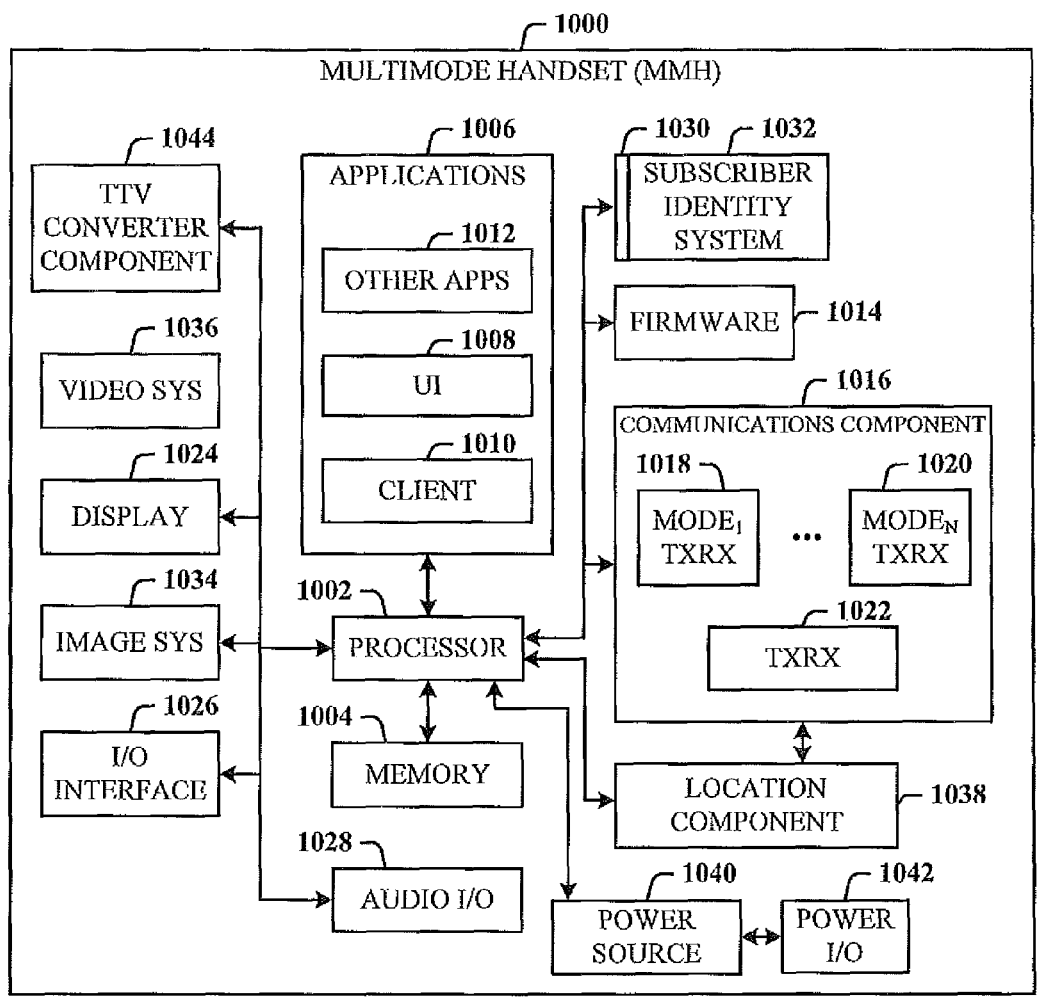
FIG. 10 illustrates a schematic block diagram of an exemplary multimode handset in accordance with an innovative aspect.

FIG. 10 illustrates a schematic block diagram of an exemplary multimode handset 1000 in accordance with an innovative aspect. In order to provide additional context for various aspects thereof, FIG. 10 and the following are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 1000 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 1000 includes a processor 1002 for controlling and processing onboard operations and functions. A memory 1004 interfaces to the processor 1002 for the storage of data and one or more applications 1006 (e.g., a video player software, user feedback component software, etc.). The applications 1006 can also include a user interface (UI) application 1008 that operates with a client 1010 (e.g., operating system) to facilitate user interaction with handset functionality and data, for example, answering/initiating calls, entering/deleting data, configuring settings, address book manipulation, multimode interaction, etc. The applications 1006 can include other applications 1012 that came installed with the handset 1006 and/or can be installed as add-ons or plug-ins to the client 1010 and/or UI 1008, for example, or for other purposes (e.g., processor, firmware, etc.).

The other applications 1012 can include voice recognition of predetermined voice commands that facilitate user control, call voice processing, voice recording, messaging, email processing, video processing, image processing, music play, as well as subsystems or components described infra. Some of the applications 1006 can be stored in the memory 1004 and/or in a firmware 1014, and executed by the processor 1002 from either or both the memory 1004 or/and the firmware 1014. The firmware 1014 can also store code for execution in power-up initialization and control during normal operation of the handset 1000.

A communications component 1016 can interface to the processor 1002 to facilitate wired/wireless communications with external systems, for example, cellular networks, VoIP (voice-over-IP) networks, local wireless networks or personal wireless networks such as Wi-Fi, Wi-Max, and so on. Here, the communications component 1016 can also include a multimode communications subsystem for providing cellular communications via different cellular technologies. For example, a first cellular transceiver 1018 (e.g., GSM) can be one mode and an Nth transceiver 1020 can provide cellular communications via an Nth cellular network (e.g., UMTS), where N is a positive integer. The communications component 1016 can also include a transceiver 1022 for unlicensed communications (e.g., Wi-Fi, Wi-Max, Bluetooth, etc.) for corresponding communications. The communications component 1016 can also facilitate communications reception from terrestrial radio networks (e.g., broadcast), digital satellite radio networks, and Internet-based radio services networks.

The handset 1000 can process IP data traffic via the communications component 1016 to accommodate IP traffic from an IP network such as, for example, the Internet, a corporate intranet, a home broadband network, a personal area network, etc., via an ISP or broadband cable provider. Thus, VoIP traffic can be utilized by the handset 1000 and IP-based multimedia content can be received in an encoded and/or decoded format.

The handset 1000 includes a display 1024 for displaying multimedia that include text, images, video, telephony functions (e.g., a Caller ID function), setup functions, menus, etc. The display 1024 can also accommodate the presentation of multimedia content (e.g., music metadata, messages, wallpaper, graphics, etc.).

An input/output (I/O) interface 1026 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 1026 can be utilized for updating and/or troubleshooting the handset 1000, for example.

Audio capabilities can be provided via an audio I/O component 1028, which can include a speaker for the output of audio signals related to, for example, indication that the user pressed the proper key or key combination to initiate the user feedback signal, call signals, music, etc. The audio I/O component 1028 also facilitates the input of audio signals via a microphone to record data and/or telephony voice data, and for inputting voice signals for telephone conversations.

The handset 1000 can include a slot interface 1030 for accommodating a subscriber identity system 1032 that can accommodate a SIM or universal SIM (USIM), and interfacing the subscriber identity system 1032 with the processor 1002. However, it is to be appreciated that the subscriber identity system 1032 can be manufactured into the handset 1000, and updated by downloading data and software thereinto.

An image capture and processing system 1034 (e.g., a camera) can be provided for decoding encoded image content. Additionally, as indicated, photos can be obtained via an associated image capture subsystem of the image system 1034. The handset 1000 can also include a video component 1036 for processing video content received and, for recording and transmitting video content.

Optionally, a geolocation component 1038 (e.g., UPS-global positioning system) facilitates receiving geolocation signals (e.g., from satellites via the communications component 1016) that define the location of the handset 1000. Alternatively, or in combination therewith, the geolocation component 1038 can facilitate triangulation processing for locating the handset 1000.

The handset 1000 also includes a power source 1040 in the form of batteries and/or an AC power subsystem, which power source 1040 can interface to an external power system or charging equipment (not shown) via a power I/O component 1042.

The handset 1000 can also include a TTV converter component 1044 for local conversion of text-based messages (e.g., email) into voice (or audio) files. The voice files can then be communicated via the handset communications component 1016 to the vehicle media system 112 for audio playback.

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wire Ethernet networks used in many offices.

The law does not require and it is economically prohibitive to illustrate and teach every possible embodiment of the present claims. Hence, the above-described embodiments are merely exemplary illustrations of implementations set forth for a clear understanding of the principles of the invention.

Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, for providing a converted message to a vehicle media system, comprising:
   receiving, by a text-to-audio converter component, from an internet protocol multimedia system being distinct from and in communication with the text-to-audio converter component, a registration request relating to a mobile communication device, the registration request being received following an associating, by the internet protocol multimedia system, of an internet protocol address with the mobile communication device;
   associating the internet protocol address with the mobile communication device, by the text-to-audio converter component, in response to receiving the registration request from the internet protocol multimedia system;
   converting, by the text-to-audio converter component, a text-based communication to an audio message; and
   transmitting, by the text-to-audio converter component using the internet protocol address, the audio message to the mobile communication device for subsequent transmission to the vehicle media system.

2. The method of claim 1, further comprising transmitting, by the internet protocol multimedia system, to the text-to-audio converter component, the registration request relating to the mobile communication device.

3. The method of claim 1, further comprising:
   transmitting, by the text-to-audio converter, to the internet protocol multimedia system, a confirmation of registration of the mobile communication device with the text-to-audio converter component.

4. The method of claim 1, further comprising subscribing, by the test-to-audio converter component, the mobile communication device to the text-to-audio converter component.

5. The method of claim 1, further comprising:
   receiving, from the internet protocol multimedia system, a subscribe request to subscribe the mobile communication device to the text-to-audio converter component; and
   transmitting, to the internet protocol multimedia system for delivery to the mobile communication device, a subscription notice-confirming subscription of the mobile communication device to the text-to-audio converter component.

6. The method of claim 1, further comprising:
   transmitting, to the Internet protocol multimedia system, for delivery to the mobile communication device, a confirmation of subscription confirming subscription by the text-to-audio converter component of the mobile communication device to the text-to-audio converter component.

7. A text-to-audio converter system, for providing a converted message to a vehicle media system, comprising:
   a processor; and
   a memory having stored thereon computer-executable instructions that, when executed by the processor, cause the processor to perform operations comprising:

receiving, from an Internet protocol multimedia system being separate from and in communication with the text-to-audio converter system, a registration request includinq an internet protocol address associated, by the Internet protocol multimedia system, with a mobile communication device;

associating the Internet protocol address with the mobile communication device;

converting a text-based communication to an audio message; and transmitting, using the internet protocol address, the audio message to the mobile communication device for subsequent transmission to the vehicle media system.

8. The text-to-audio converter system of claim 7, wherein the computer-executable instructions, when executed by the processor, cause the processor to perform operations further comprising transmitting, to the internet protocol multimedia subsystem, a confirmation of registration of the mobile communication device with the text-to-audio converter subsystem.

9. The text-to-audio converter system of claim 7, wherein the computer-executable instructions, when executed by the processor, cause the processor to perform operations further comprising subscribing, using the internet protocol address, the mobile communication device to the text-to-audio converter component.

10. The text-to-audio converter system of claim 9, wherein:
the computer-executable instructions, when executed by the processor, cause the processor to perform operations further comprising receiving a subscribe request from the internet protocol multimedia system; and
the operation of subscribing the mobile communication device to the text-to-audio converter component is performed, by the processor, in response ,o receiving the subscribe request at the text-to-audio converter component from the Internet protocol multimedia system.

11. The text-to-audio converter system of claim 7, wherein the computer-executable instructions, when executed by the processor, cause the processor to perform operations further comprising transmitting, to the internet protocol multimedia system, for delivery to the mobile communication device, a subscription notice confirming subscription of the mobile communication device to the text-to-audio converter component.

12. A tangible computer-readable storage medium, for use in a text-to-audio converter component, comprising computer-executable instructions that, when executed by a processor, cause the processor to perform operations comprising:

receiving, from an internet protocol multimedia system being separate from and in communication with the text-to-audio converter component, a registration request including an internet protocol address associated, by the internet protocol multimedia system, with a mobile communication device;

associating, in response to receiving the registration request, the internet protocol address with the mobile communication device at the text-to-audio converter component;

converting a text-based communication to an audio message; and transmitting, using the internet protocol address, the audio message to the mobile communication device for subsequent transmission to a vehicle media system.

13. The tangible computer-readable storage medium of claim 12, wherein the computer-executable instructions, when executed by the processor, cause the processor to perform the operations further comprising transmitting, to the internet protocol multimedia system, in response to associating the internet protocol address with the mobile communication device, a confirmation of registration of the mobile communication device with the text-to-audio converter component.

14. The tangible computer-readable storage medium of claim 12, wherein the computer-executable instructions, when executed by the processor, cause the processor to perform the operations further comprising subscribing, using the internet protocol address, the mobile communication device to the text-to-audio converter component.

15. The tangible computer-readable storage medium of claim 14, wherein:
the computer-executable instructions, when executed by the processor, cause the processor to perform the operations further comprising receiving a subscribe request from the internet protocol multimedia system; and
the operation of subscribing the mobile communication device to the text-to-audio converter component is performed, by the processor, in response to receiving the subscribe request at the text-to-audio converter component from the Internet protocol multimedia system.

16. The tangible computer-readable storage medium of claim 12, wherein the computer-executable instructions, when executed by the processor, cause the processor to perform the operations further comprising transmitting, to the internet protocol multimedia system, for delivery to the mobile communication device, a subscription notice confirming subscription of the mobile communication device to the text-to-audio converter component.

* * * * *